United States Patent
Tsai et al.

(10) Patent No.: US 8,809,825 B2
(45) Date of Patent: Aug. 19, 2014

(54) PAPER SIZE DETECTION DEVICE HAVING A SAME SENSOR TRIGGERABLE BY TWO OPPOSITE SWITCHES AND DETECTION METHOD THEREOF

(75) Inventors: Wei-Xiang Tsai, New Taipei (TW); Shih-Chung Liu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 261 days.

(21) Appl. No.: 13/468,075

(22) Filed: May 10, 2012

(65) Prior Publication Data

US 2013/0299681 A1 Nov. 14, 2013

(51) Int. Cl.
*G01N 21/86* (2006.01)
*G01V 8/00* (2006.01)

(52) U.S. Cl.
USPC .............. 250/559.24; 250/222.1; 250/206; 358/449

(58) Field of Classification Search
USPC .............. 250/206, 208.2, 221, 222.1, 559.24; 358/449
See application file for complete search history.

(56) References Cited

U.S. PATENT DOCUMENTS 5,890,708 A * 4/1999 Song ..................... 271/10.03
2008/0174065 A1* 7/2008 Kita et al. ............. 271/258.01

* cited by examiner

*Primary Examiner* — Francis M Legasse, Jr.
(74) *Attorney, Agent, or Firm* — Lin & Associates IP, Inc.

(57) ABSTRACT

A paper size detection device includes a central switch, at least two switches disposed to two opposite sides of the central switch at intervals, and at least a sensor corresponding to the two switches located at the two opposite sides of the central switch. The sensor can be designated as a light sensor. One switch triggers the sensor and the other switch is without triggering the sensor under an original no paper condition. So that a detection method of the paper size detection device that uses N light sensors to judge N*2 papers' size can be realized by virtue of the above-mentioned setting structure, N is a positive integer, such as 2, 3, 4 and so on. Thus, the paper size detection device has a simple structure and a lower manufacture cost, and the detection method of the paper size detection device is simplified, accordingly.

10 Claims, 5 Drawing Sheets

PAPER SIZE DETECTION DEVICE HAVING A SAME SENSOR TRIGGERABLE BY TWO OPPOSITE SWITCHES AND DETECTION METHOD THEREOF

BACKGROUND OF THE INVENTION

1. Field of the Invention

The present invention generally relates to a paper size detection device, and more particularly to a paper size detection device having a simple structure and a lower manufacture cost, and a detection method thereof.

2. The Related Art

Figure 12:
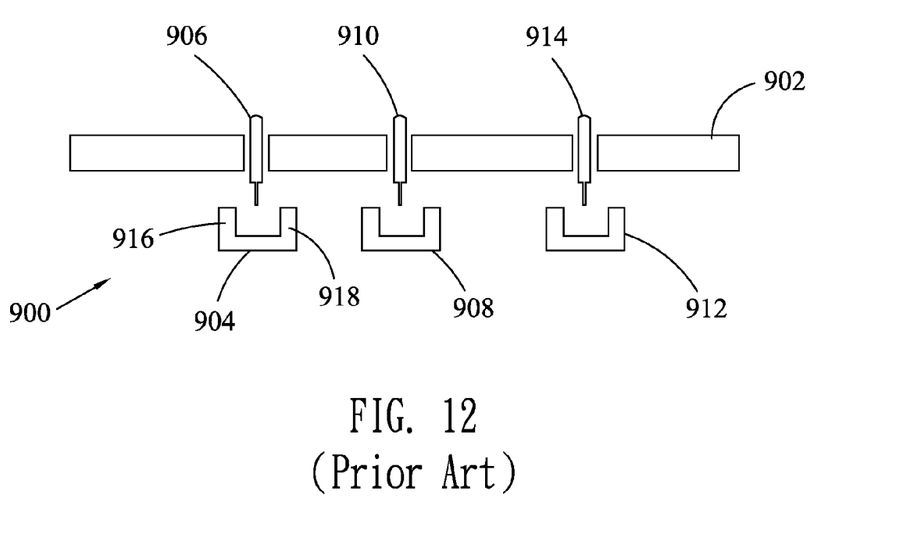
FIG. 12 is a side view of a paper size detection device in prior art.

Referring to FIG. 12, a current paper size detection device 900 adapted for being mounted to a paper platform 902 includes a first light sensor 904, a first switch 906, a second light sensor 908, a second switch 910, a third light sensor 912 and a third switch 914. The first light sensor 904, the second light sensor 908 and the third light sensor 912 are disposed in the paper platform 902. The first switch 906, the second switch 910 and the third switch 914 are separately disposed to the paper platform 902 with top ends thereof projecting beyond a top surface of the paper platform 902 at intervals, and tail ends thereof corresponding to the first light sensor 904, the second light sensor 908 and the third light sensor 912, separately.

Each of the first light sensor 904, the second light sensor 908 and the third light sensor 912 has a light emitting portion 916 and a light receiving portion 918 parallel to each other. The light emitting portion 916 and the light receiving portion 918 have a same operation principle in the first light sensor 904, the second light sensor 908 and the third light sensor 912. Now take the first light sensor 904 for example to explain, when there are no obstacles disposed between the light emitting portion 916 and the light receiving portion 918, light beams emitted by the light emitting portion 916 are able to be received by the light receiving portion 918, and then the first light sensor 904 outputs a high level signal. When the tail end of the first switch 906 moves to a middle position between the light emitting portion 916 and the light receiving portion 918, the light beams emitted by the light emitting portion 916 are blocked by the tail end of the first switch 906 that results in the light receiving portion 918 has no way to receive the light beams emitted by the light emitting portion 916, and then the first light sensor 904 outputs a low level signal.

When the paper size detection device 900 is operated, operations of the first light sensor 904, the second light sensor 908, the third light sensor 912, the first switch 906, the second switch 910 and the third switch 914 are described as follows. When there is no paper put on the paper platform 902, the top ends of the first switch 906, the second switch 910 and the third switch 914 project beyond the top of the paper platform 902, and the tail ends of the first switch 906, the second switch 910 and the third switch 914 are disposed out of the first light sensor 904, the second light sensor 908, the third light sensor 912, separately, thus, the first light sensor 904, the second light sensor 908 and the third light sensor 912 separately output the high level signal. So, when the first light sensor 904, the second light sensor 908 and the third light sensor 912 separately output the high level signal, it can be judged that there is no paper put on the paper platform 902.

When there is a small-sized paper put on the paper platform 902, the small-sized paper can just press against the top end of the first switch 906, and then brings along the tail end of the first switch 906 to move into the first light sensor 904 and obstruct the first light sensor 904, thus, the signal outputted by the first light sensor 904 turns from high level to low level. So, when the first light sensor 904 outputs the low level signal, and the second light sensor 908 and the third light sensor 912 respectively output the high level signal, it can be judged that there is the small-sized paper put on the paper platform 902.

When there is a middle-sized paper put on the paper platform 902, the middle-sized paper can just press against the top ends of the first switch 906 and the second switch 910, and then brings along the tail ends of the first switch 906 and the second switch 910 to respectively move into the first light sensor 904 and the second light sensor 908 and obstruct the first light sensor 904 and the second light sensor 908, thus, the signal respectively outputted by the first light sensor 904 and the second light sensor 908 turns from high level to low level. So, when the first light sensor 904 and the second light sensor 908 respectively output the low level signal, and the third light sensor 912 outputs the high level signal, it can be judged that there is the middle-sized paper put on the paper platform 902.

When there is a large-sized paper put on the paper platform 902, the large-sized paper can just press against the top ends of the first switch 906, the second switch 910 and the third switch 914, and then brings along the tail ends of the first switch 906, the second switch 910 and the third switch 914 to separately move into the first light sensor 904, the second light sensor 908 and the third light sensor 912, and obstruct the first light sensor 904, the second light sensor 908 and the third light sensor 912, thus, the signal respectively outputted by the first light sensor 904, the second light sensor 908 and the third light sensor 912 turns from high level to low level. So, when the first light sensor 904, the second light sensor 908 and the third light sensor 912 separately output the low level signal, it can be judged that there is the large-sized paper put on the paper platform 902.

However, the paper size detection device 900 needs the above-mentioned three light sensors to cooperate with the above-mentioned three switches to be able to detect the above-mentioned three sizes of the papers. Therefore, the aforesaid setting structure of the paper size detection device 900 needs more elements that results in the paper size detection device 900 having a complex structure and a higher manufacture cost.

SUMMARY OF THE INVENTION

An object of the present invention is to provide a paper size detection device having a simple structure and a lower manufacture cost. The paper size detection device includes a central switch, at least two switches disposed to two opposite sides of the central switch at intervals, and at least a sensor corresponding to the two switches located at the two opposite sides of the central switch. One of the switches triggers the sensor under an original no paper condition, and the other one of the switches is without triggering the sensor under the original no paper condition.

Another object of the present invention is to provide a detection method of the paper size detection device. The detection method of the paper size detection device is described hereinafter. Set a central switch. Set a same quantity of switches at two opposite sides of the central switch at intervals. Set each two opposite switches as a group with respect to the central switch designated as a middle point to be corresponding to the same light sensor. Set the switches located at one side of the central switch to trigger the corresponding light sensor under the original no paper condition. Set the switches located at the other side of the central switch to be without triggering the corresponding light sensor under the original no paper condition.

As described above, the detection method of the paper size detection device that uses N light sensors to judge N*2 papers' size can be realized by virtue of the above-mentioned setting structure, N is a positive integer, such as 2, 3, 4 and so on. Thus, the paper size detection device has a simple structure and a lower manufacture cost, and the detection method of the paper size detection device is simplified, accordingly.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
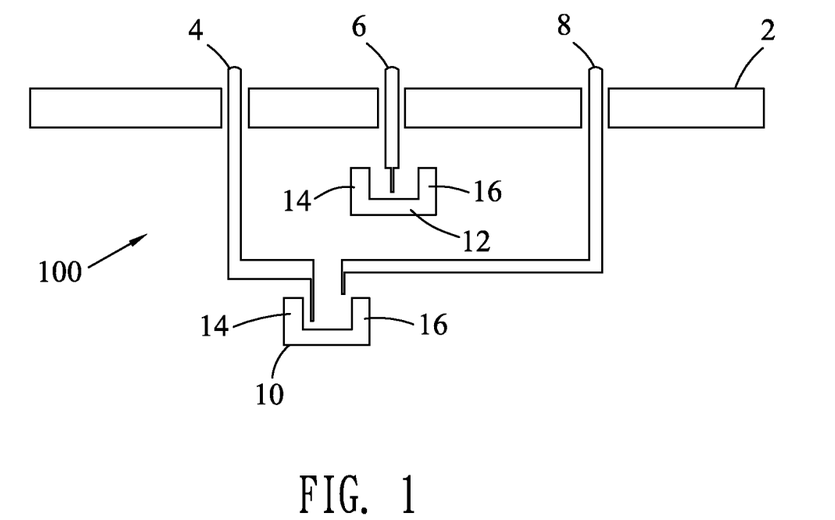
FIG. 1 is a side view of a paper size detection device in accordance with a first embodiment of the present invention.

With reference to FIG. 1, a paper size detection device 100 in accordance with the present invention is shown. The paper size detection device 100 includes a central switch, at least two switches disposed to two opposite sides of the central switch at intervals, and at least a sensor corresponding to the two switches located at the two opposite sides of the central switch. The sensor can be designated as a light sensor. One of the switches triggers the sensor under an original no paper condition, and the other one of the switches is without triggering the sensor under the original no paper condition. The paper size detection device 100 in accordance with a first embodiment of the present invention includes a first switch 4, a second switch 6 acted as the central switch, a third switch 8, a first light sensor 10 and a second light sensor 12. The paper size detection 100 is adapted for being mounted to a paper platform 2. The first switch 4, the second switch 6 and the third switch 8 are separately disposed to the paper platform 2 in sequence, with top ends thereof projecting beyond a top surface of the paper platform 2 and being spaced at intervals, and tail ends of the first switch 4 and the third switch 8 corresponding to the first light sensor 10, and the tail end of the second switch 6 corresponding to the second light sensor 12. The first light sensor 10 and the second light sensor 12 are disposed in the paper platform 2. The second switch 6 is located between the first switch 4 and the third switch 8, and the top end of the second switch 6 is located between the top ends of the first switch 4 and the third switch 8, correspondingly.

The first light sensor 10 and the second light sensor 12 respectively has a light emitting portion 14 and a light receiving portion 16 parallel to the light emitting portion 14. The light emitting portion 14 and the light receiving portion 16 have a same operation principle in the first light sensor 10 and the second light sensor 12. Now take the first light sensor 10 for example to explain, when there are no obstacles disposed between the light emitting portion 14 and the light receiving portion 16, light beams emitted by the light emitting portion 14 are able to be received by the light receiving portion 16, and then the first light sensor 10 outputs a first level signal. When the tail end of the first switch 4 moves to a middle position between the light emitting portion 14 and the light receiving portion 16, the light beams emitted by the light emitting portion 14 is blocked by the tail end of the first switch 4 that results in the light receiving portion 16 has no way to receive the light beams emitted by the light emitting portion 14, and then the first light sensor 10 outputs a second level signal. In this first embodiment, the first level signal is a high level signal, and the second level signal is a low level signal. In a specific implementation of the first embodiment, the first level signal can be the low level signal, so the second level signal is the high level signal.

Referring to FIGS. 1-5, when the paper size detection device 100 is operated, operations of the first switch 4, the second switch 6, the third switch 8, the first light sensor 10 and the second light sensor 12 are described as follows.

Figure 2:
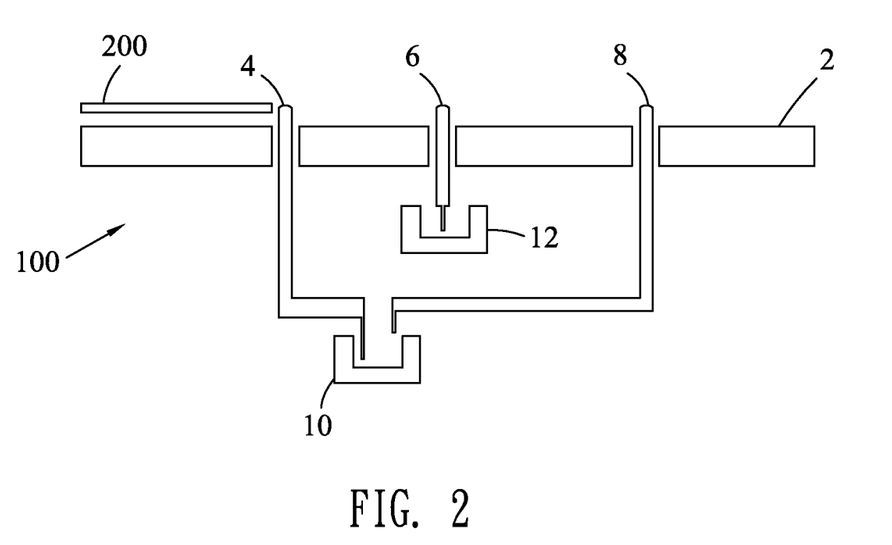
FIG. 2 is a side view of a small-sized paper being put on a paper platform of the paper size detection device in accordance with the first embodiment of the present invention of FIG. 1.

Referring to FIG. 1 and FIG. 2, when there is no paper or a small-sized paper 200 put on the paper platform 2, the top ends of the first switch 4, the second switch 6 and the third switch 8 separately project beyond the top surface of the paper platform 2, and the tail end of the first switch 4 stretches into the first light sensor 10 to be located between the light emitting portion 14 and the light receiving portion 16 and obstructs the first light sensor 10, the tail end of the second switch 6 stretches into the second light sensor 12 to be located between the light emitting portion 14 and the light receiving portion 16 of the second light sensor 12 and obstructs the second light sensor 12, and the tail end of the third switch 8 is disposed out of the light emitting portion 14 and the light receiving portion 16 of the first light sensor 10. Thus, the first light sensor 10 and the second light sensor 12 respectively output the low level signal. So, when the first light sensor 10 and the second light sensor 12 respectively output the low level signal, it can be judged that there is no paper or the small-sized paper 200 put on the paper platform 2.

Figure 3:
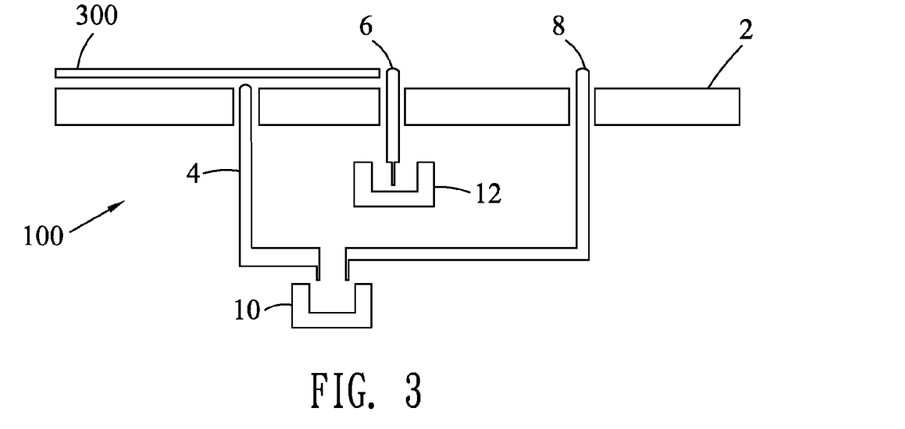
FIG. 3 is a side view of a middle-sized paper being put on the paper platform of the paper size detection device in accordance with the first embodiment of the present invention of FIG. 1.

Referring to FIG. 1 and FIG. 3, when there is a middle-sized paper 300 put on the paper platform 2, the middle-sized paper 300 can just press against the top end of the first switch 4, and then brings along the tail end of the first switch 4 to move away from the first light sensor 10, thus, the signal outputted by the first light sensor 10 turns from the low level to high level. So, when the first light sensor 10 outputs the high level signal, and the second light sensor 12 outputs the low level signal, it can be judged that there is the middle-sized paper 300 put on the paper platform 2.

Figure 4:
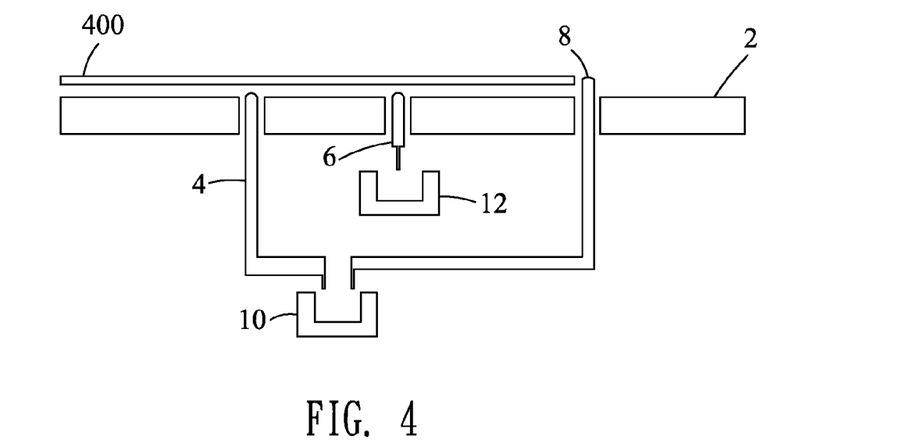
FIG. 4 is a side view of a large-sized paper being put on the paper platform of the paper size detection device in accordance with the first embodiment of the present invention of FIG. 1.

Referring to FIG. 1 and FIG. 4, when there is a large-sized paper 400 put on the paper platform 2, the large-sized paper 400 can just press against the top ends of the first switch 4 and the second switch 6, and then brings along the tail ends of the first switch 4 and the second switch 6 to respectively move away from the first light sensor 10 and the second light sensor 12, namely, the tail end of the first switch 4 is disposed out of the light emitting portion 14 and the light receiving portion 16 of the first light sensor 10 and the tail end of the second switch 6 is disposed out of the light emitting portion 14 and the light receiving portion 16 of the second light sensor 12, thus, the signal respectively outputted by the first light sensor 10 and the second light sensor 12 turns from low level to high level. So, when the first light sensor 10 and the second light sensor 12 respectively output the high level signal, it can be judged that there is the large-sized paper 400 put on the paper platform 2.

Figure 5:
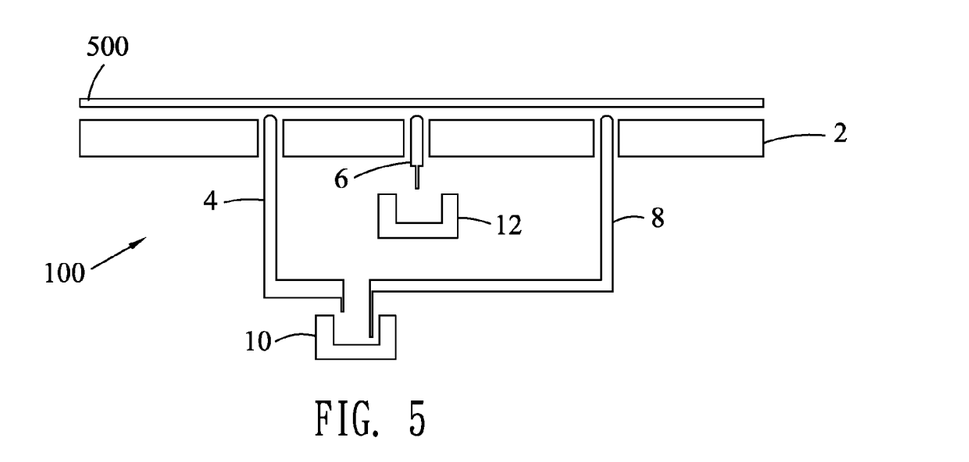
FIG. 5 is a side view of a super large-sized paper being put on the paper platform of the paper size detection device in accordance with the first embodiment of the present invention of FIG. 1.

Referring to FIG. 1 and FIG. 5, when there is a super large-sized paper 500 put on the paper platform 2, the super large-sized paper 500 can just press against the top ends of the first switch 4, the second switch 6 and the third switch 8, and then brings along the tail ends of the first switch 4 and the second switch 6 to respectively move away from the first light sensor 10 and the second light sensor 12, and brings along the tail end of the third switch 8 to move to stretch into the first light sensor 10 to be located between the light emitting portion 14 and the light receiving portion 16 of the first light sensor 10 and obstruct the first light sensor 10. Thus, the first light sensor 10 outputs the low level signal, and the second light sensor 12 outputs the high level signal. So, when the first light sensor 10 outputs the low level signal, and the second light sensor 12 outputs the high level signal, it can be judged that there is the super large-sized paper 500 put on the paper platform 2.

Referring to FIGS. 6-9, the paper size detection device 100 in accordance with a second embodiment of the present invention is shown. A setting structure difference between the first embodiment and the second embodiment of the paper size detection device 100 is that the tail end of the second switch 6 which is acted as the central switch is disposed out of the light emitting portion 14 and the light receiving portion 16 of the second light sensor 12 when there is no paper put on the platform 2.

In the second embodiment, when the paper size detection device 100 is operated, operations of the first switch 4, the second switch 6, the third switch 8, the first light sensor 10 and the second light sensor 12 are described as follows.

Figure 6:
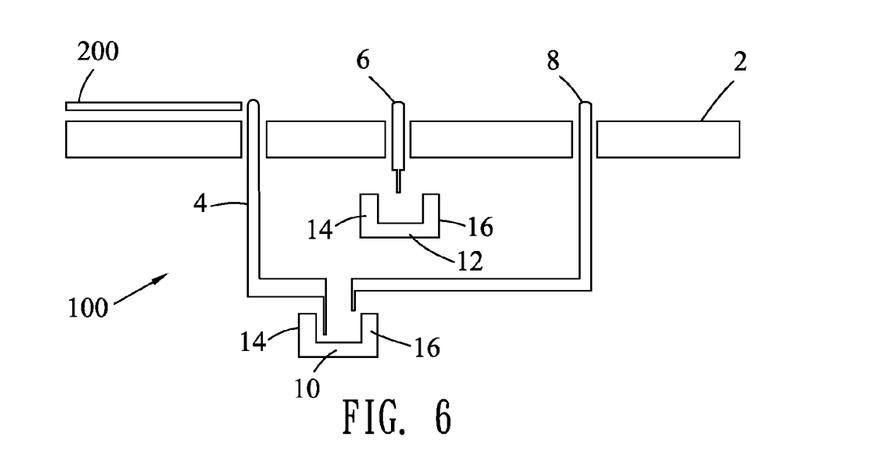
FIG. 6 is a side view of the small-sized paper being put on the paper platform of the paper size detection device in accordance with a second embodiment of the present invention.

Referring to FIG. 6, when there is no paper or the small-sized paper 200 put on the paper platform 2, the top ends of the first switch 4, the second switch 6 and the third switch 8 separately project beyond the top surface of the paper platform 2, and the tail end of the first switch 4 stretches into the first light sensor 10 to be located between the light emitting portion 14 and the light receiving portion 16 of the first light sensor 10 and obstructs the first light sensor 10, the tail end of the second switch 6 is disposed out of the light emitting portion 14 and the light receiving portion 16 of the second light sensor 12, and the tail end of the third switch 8 is disposed out of the light emitting portion 14 and the light receiving portion 16 of the first light sensor 10. Thus, the first light sensor 10 outputs the low level signal and the second light sensor 12 outputs the high level signal. So, when the first light sensor 10 outputs the low level signal and the second light sensor 12 outputs the high level signal, it can be judged that there is no paper or the small-sized paper 200 put on the paper platform 2.

Figure 7:
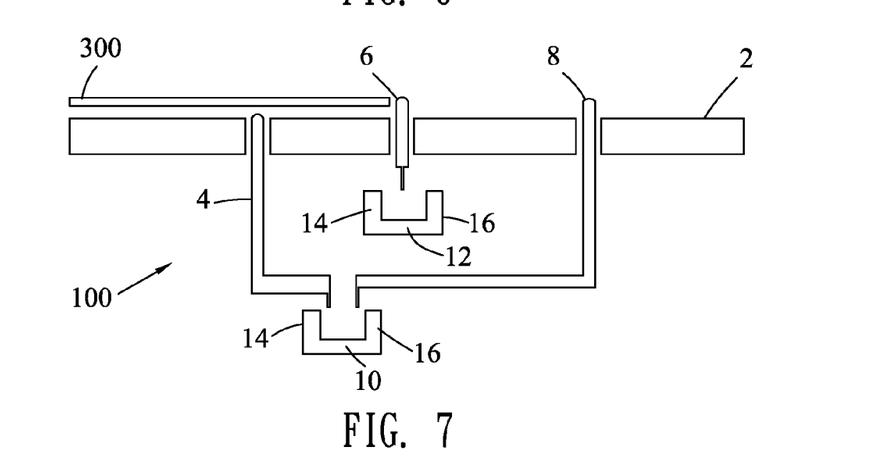
FIG. 7 is a side view of the middle-sized paper being put on the paper platform of the paper size detection device in accordance with the second embodiment of the present invention of FIG. 6.

Referring to FIG. 7, when there is the middle-sized paper 300 put on the paper platform 2, the middle-sized paper 300 can just press against the top end of the first switch 4, and then brings along the tail end of the first switch 4 to move away from the first light sensor 10, thus, the signal outputted by the first light sensor 10 turns from the low level to high level. So, when the first light sensor 10 and the second light sensor 12 respectively output the high level signal, it can be judged that there is the middle-sized paper 300 put on the paper platform 2.

Figure 8:
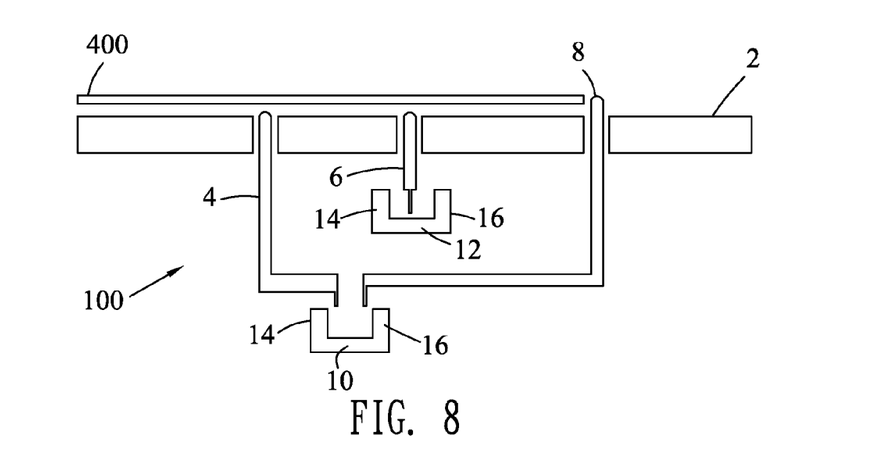
FIG. 8 is a side view of the large-sized paper being put on the paper platform of the paper size detection device in accordance with the second embodiment of the present invention of FIG. 6.

Referring to FIG. 8, when there is the large-sized paper 400 put on the paper platform 2, the large-sized paper 400 can just press against the top ends of the first switch 4 and the second switch 6, and then brings along the tail end of the first switch 4 to move away from the first light sensor 10 and brings along the tail end of the second switch 6 to move to stretch into the second light sensor 12 to be located between the light emitting portion 14 and the light receiving portion 16 of the second light sensor 12, thus, the first light sensor 10 outputs the high level signal and the second light sensor 12 outputs the low level signal. So, when the first light sensor 10 outputs the high level signal and the second light sensor 12 outputs the low level signal, it can be judged that there is the large-sized paper 400 put on the paper platform 2.

Figure 9:
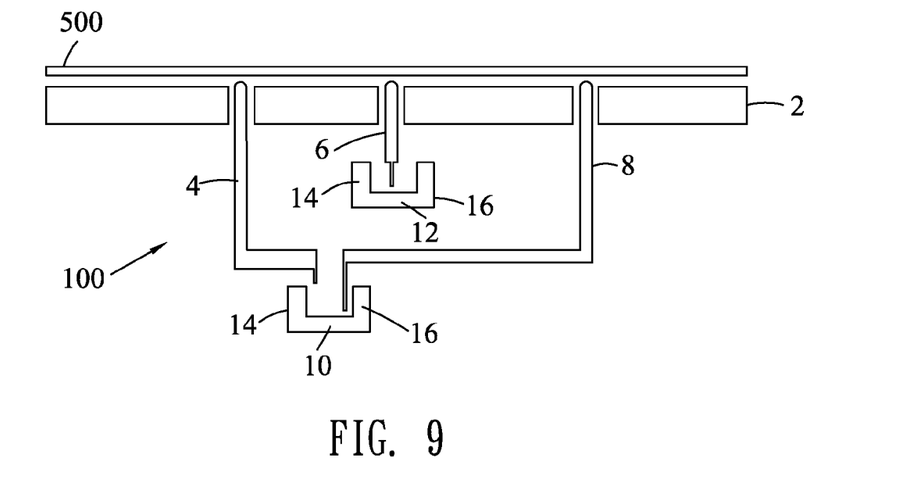
FIG. 9 is a side view of the super large-sized paper being put on the paper platform of the paper size detection device in accordance with the second embodiment of the present invention of FIG. 6.

Referring to FIG. 9, when there is the super large-sized paper 500 put on the paper platform 2, the super large-sized paper 500 can just press against the top ends of the first switch 4, the second switch 6 and the third switch 8, and then brings along the tail end of the first switch 4 to move away from the first light sensor 10, and brings along the tail ends of the second switch 6 and the third switch 8 to move to stretch into the second light sensor 12 and the first light sensor 10 to make the tail end of the second switch 6 located between the light emitting portion 14 and the light receiving portion 16 of the second light sensor 12, and the tail end of the third switch 8 located between the light emitting portion 14 and the light receiving portion 16 of the first light sensor 10, and obstruct the second light sensor 12 and the first light sensor 10, respectively. Thus, the first light sensor 10 and the second light sensor 12 respectively output the low level signal. So, when the first light sensor 10 and the second light sensor 12 respectively output the low level signal, it can be judged that there is the super large-sized paper 500 put on the paper platform 2.

Figure 10:
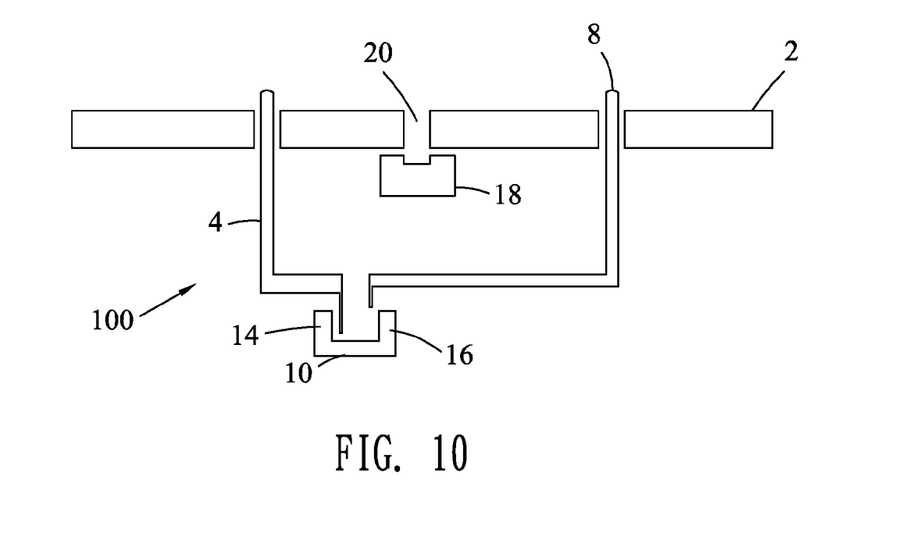
FIG. 10 is a side view of the paper size detection device in accordance with a third embodiment of the present invention.

Referring to FIG. 10, the paper size detection device 100 in accordance with a third embodiment of the present invention is shown. The second switch 6 which is acted as the central switch and the second light sensor 12 can be replaced by a photosensitive element 18. The photosensitive element 18 is disposed in the paper platform 2. A top of the paper platform 2 defines a perforation 20 corresponding to the photosensitive element 18. When the paper is put on the paper platform 2 to cover up the perforation 20, the photosensitive element 18 has no way to sense external beams, thus, the photosensitive element 18 outputs the low level signal. When the perforation 20 is without being covered up, the external beams can be shot into the photosensitive element 18 through the perforation 20, the photosensitive element 18 senses the external beams, thus the photosensitive element 18 outputs the high level signal. In a specific implementation of the third embodiment, when the photosensitive element 18 has no way to sense the external beams, the photosensitive element 18 also can output the high level signal, accordingly, when the photosensitive element 18 senses the external beams, the photosensitive element 18 outputs the low level signal.

Figure 11:
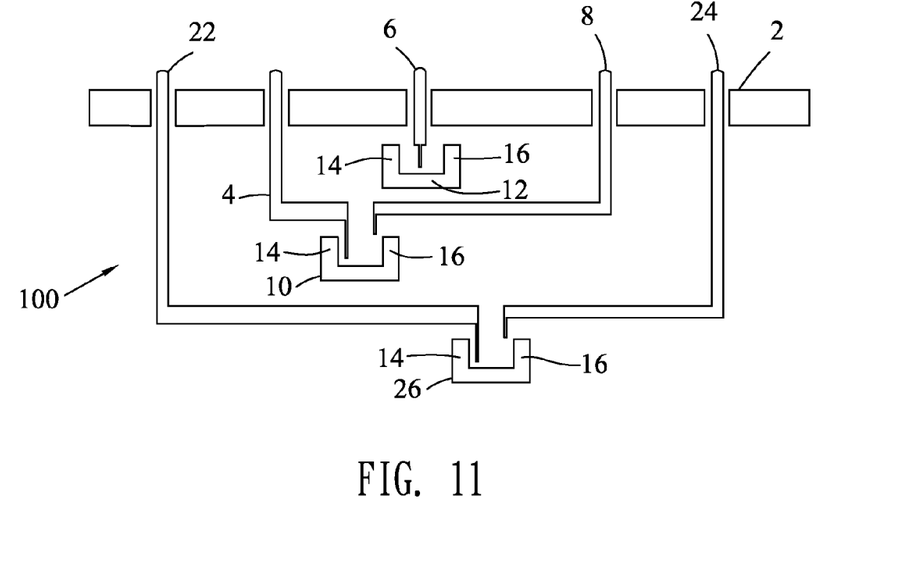
FIG. 11 is a side view of the paper size detection device in accordance with a fourth embodiment of the present invention.

Referring to FIG. 11, the paper size detection device 100 in accordance with a fourth embodiment of the present invention is shown. In the fourth embodiment, the paper size detection device 100 according to the present invention further includes a fourth switch 22, a fifth switch 24 and a third light sensor 26. The third light sensor 26 has the light emitting portion 14, and the light receiving portion 16 parallel to the light emitting portion 14. The fourth switch 22 and the fifth switch 24 are respectively disposed to the paper platform 2 with top ends thereof projecting beyond the top surface of the paper platform 2 and being spaced at intervals, and tail ends thereof corresponding to the third light sensor 26. In a specific implementation of the fourth embodiment, the light sensor can be replaced by an inductor which has a function equivalent to that of the light sensor.

In the fourth embodiment, an operation principle of the paper size detection device 100 can be deduced from the first embodiment, the second embodiment and the third embodiment. Herein, the operation principle of the paper size detection 100 need be no more described in detail. The first switch 4, the second switch 6, the third switch 8, the fourth switch 22 and the fifth switch 24 of the paper size detection device 100 in accordance with the fourth embodiment of the present invention are operated to trigger the first light sensor 10, the second light sensor 12 and the third light sensor 26 so as to generate a series of level signal statuses. The specific level signal statuses of the first light sensor 10, the second light sensor 12 and the third light sensor 26 under the action of operating the first switch 4, the second switch 6, the third switch 8, the fourth switch 22 and the fifth switch 24 are described as follows.

When there is a first size of paper put on the paper platform 2, the first light sensor 10, the second light sensor 12 and the third light sensor 26 respectively output the high level signal. When there is a second size of paper put on the paper platform 2, the first light sensor 10 outputs the low level signal, and the second light sensor 12 and the third light sensor 26 respectively output the high level signal. When there is a third size of paper put on the paper platform 2, the first light sensor 10 and the second light sensor 12 respectively output the low level signal, and the third light sensor 26 outputs the high level signal. When there is a fourth size of paper put on the paper platform 2, the first light sensor 10, the second light sensor 12 and the third light sensor 26 respectively output the low level signal. When there is a fifth size of paper put on the paper platform 2, the first light sensor 10 and the third light sensor 26 respectively output the low level signal, and the second light sensor 12 outputs the high level signal. When there is a sixth size of paper is put on the paper platform 2, the first light sensor 10 and the second light sensor 12 respectively output the high level signal, and the third light sensor 26 outputs the low level signal.

Referring to FIGS. 1-11, from the first embodiment to the fourth embodiment, it can be known that steps of setting the structure of the paper size detection device 100 are described as follows. The fourth switch 22 and the fifth switch 24 located at two opposite sides of the paper size detection device 100 are corresponding to a same light sensor, namely the third light sensor 26, the first switch 4 located between the second switch 6 and the fourth switch 22, and the third switch 8 located between the second switch 6 and the fifth switch 24 are corresponding to another same light sensor, namely, the first light sensor 10, and the second switch 6 located in a middle of the paper size detection device 100 is corresponding to the second light sensor 12, in addition, the fourth switch 22 and the first switch 4 located in front of the second switch 6 obstruct the corresponding third light sensor 26 and the first light sensor 10 under the original condition of no paper being put on the paper platform 2, and the fifth switch 24 and the third switch 8 located in rear of the second switch 6 are apart from the corresponding third light sensor 26 and the first light sensor 10 under the original condition of no paper being put on the paper platform 2. When the different sizes of papers are put on the paper platform 2, the first switch 4 and the third switch 8 are actuated by the paper to trigger the first light sensor 10, and the second switch 6 is actuated by the paper to be triggered, so that after the first light sensor 10 and the second switch 6 are triggered, it makes no more than four level signals be generated to detect no more than four sizes of the papers. So that a detection method of the paper size detection device 100 that uses N light sensors to judge N*2 papers' size can be realized by virtue of the above-mentioned setting structure, N is a positive integer, such as 2, 3, 4 and so on.

As described above, the detection method of the paper size detection 100 that uses N light sensors to judge N*2 papers' size can be realized by virtue of setting the second switch 6 as the central switch, setting a same quantity of switches at two opposite sides of the central switch at intervals, namely, setting the fourth switch 22 and the first switch 4 in front of the second switch 6 and setting the fifth switch 24 and the third switch 8 in rear of the second switch 6, setting each two opposite switches as a group with respect to the central switch which is designated as a middle point to be corresponding to the same light sensor, namely, setting the fourth switch 22 and the fifth switch 24 located at the two opposite sides of the paper size detection device 100 corresponding to the third light sensor 26, the first switch 4 located between the second switch 6 and the fourth switch 22, and the third switch 8 located between the second switch 6 and the fifth switch 24 corresponding to the first light sensor 10, setting the central switch to corresponding to a single light sensor, namely, the second switch 6 located in the middle of the paper size detection device 100 corresponding to the second light sensor 12, setting the switches located at one side of the central switch to obstruct the corresponding light sensor under the original no paper condition, namely, setting the fourth switch 22 and the first switch 4 located in front of the second switch 6 to obstruct the corresponding third light sensor 26 and the first light sensor 10 under the original condition of no paper being put on the paper platform 2, and setting the switches located at the other side of the central switch to apart from the corresponding light sensor under the original no paper condition, namely, setting the fifth switch 24 and the third switch 8 located in rear of the second switch 6 to apart from the corresponding third light sensor 26 and the first light sensor 10 under the original condition of no paper being put on the paper platform 2. Thus, the detection method of the paper size detection device 100 that uses N light sensors to judge N*2 papers' size can be realized by virtue of the above-mentioned setting structure, N is a positive integer, such as 2, 3, 4 and so on. Compared with prior art, the setting structure of the paper size detection device 100 needs less elements to detect more sizes of the papers so as to make the paper size detection device 100 has a simple structure and a lower manufacture cost, and the detection method of the paper size detection device 100 is simplified, accordingly.

In a real implementation, the paper size detection device 100 is without being limited to be mounted to the paper platform 2, the paper size detection device 100 is also adapted for being disposed to a paper transmission path of a scanner, a printer, a fax machine, a photocopier or other paper processor. Dispose the top ends of the switches to project beyond the paper transmission path, when the paper passes through the paper transmission path, the paper size detection device 100 according to the present invention can detect the size of the paper. The operation principles of the paper size detection device 100 in accordance with the first, the second, the third and the fourth embodiments are appropriate for the paper size detection device 100 disposed to the paper transmission path.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A paper size detection device, comprising:
    a central switch;
    a front and a back switches disposed to two opposite sides of the central switch at intervals; and
    a same sensor triggerable by the front and back switches according a paper size on the paper size detection device;
    wherein in a first state the same sensor is triggered only by the front switch, and in a second state the same sensor is triggered only by the back switch.

2. The paper size detection device as claimed in claim 1, wherein the sensor can be designated as a light sensor, one of the switches obstructing the sensor under the original no paper condition, and the other one of the switches without obstructing the sensor under the original no paper condition.

3. A paper size detection device adapted for being mounted to a paper platform, comprising:
    a first switch disposed to the paper platform with a top end thereof projecting beyond a top surface of the paper platform;
    a second switch connected with the paper platform;
    a third switch disposed to the paper platform with a top end thereof projecting beyond the top surface of the paper platform, the top end of the first switch, the second switch and the top end of the third switch being spaced at intervals, and the second switch being located between the first switch and the third switch; and
    a first light sensor disposed in the paper platform, the first light sensor having a light emitting portion and a light receiving portion parallel to the light emitting portion, a tail end of the first switch located between the light emitting portion and the light receiving portion, a tail end of the third switch disposed out of the light emitting portion and the light receiving portion.

4. The paper size detection device as claimed in claim 3, wherein the second switch can be replaced by a photosensitive element, the photosensitive element is disposed in the paper platform, a top of the paper platform defines a perforation corresponding to the photosensitive element.

5. The paper size detection device as claimed in claim 3, further comprising a second light sensor disposed in the paper platform, the second light sensor having the light emitting portion and the light receiving portion, a top end of the second switch projecting beyond the top surface of the paper platform and located between the top ends of the first switch and the third switch, a tail end of the second switch corresponding to the second light sensor.

6. The paper size detection device as claimed in claim 5, wherein the tail end of the second switch is disposed between the light emitting portion and the light receiving portion of the second light sensor.

7. The paper size detection device as claimed in claim 5, wherein the tail end of the second switch is disposed out of the light emitting portion and the light receiving portion of the second light sensor.

8. A paper size detection device adapted for being disposed to a paper transmission path, comprising:
    a first switch, a top end of the first switch projecting beyond the paper transmission path;
    a second switch disposed to the paper transmission path;
    a third switch disposed to the paper platform with a top end thereof projecting beyond the paper transmission path, the top end of the first switch, the second switch and the top end of the third switch being spaced at intervals, and the second switch being located between the first switch and the third switch; and
    a first light sensor having a light emitting portion and a light receiving portion parallel to the light emitting portion, a tail end of the first switch located between the light emitting portion and the light receiving portion, a tail end of the third switch disposed out of the light emitting portion and the light receiving portion.

9. A detection method of the paper size detection device as claimed in claim 1, comprising the steps of:
    setting the central switch;
    setting a same quantity of switches at two opposite sides of the central switch at intervals;
    setting each two opposite switches as a group with respect to the central switch which is designated as a middle point to be corresponding to a same light sensor;
    setting the switches located at one side of the central switch to trigger the corresponding light sensor under the original no paper condition; and
    setting the switches located at the other side of the central switch to be without triggering the corresponding light sensor under the original no paper condition.

10. A detection method of the paper size detection device as claimed in claim 1, comprising the steps of:
    a first light sensor being disposed in a paper platform;
    a first switch, a second switch and a third switch being separately disposed to the paper platform in sequence; and
    the first switch obstructing the first light sensor, and the third switch apart away from the first light sensor;
    wherein when different sizes of papers are put on the paper platform, the first switch and the third switch are actuated by the paper to trigger the first light sensor, and the second switch is actuated by the paper to be triggered, so that after the first light sensor and the second switch are triggered, it makes no more than four level signals be generated to detect no more than four sizes of the papers.

* * * * *